Hinds & Lodge.
Steam Engine Piston.
No. 76,448. Patented Apr. 7, 1868.
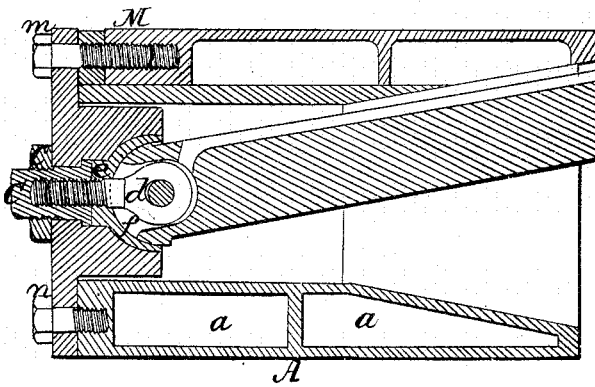
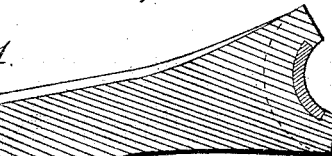
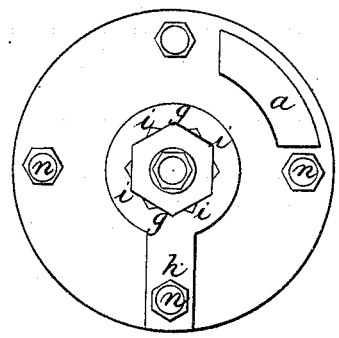
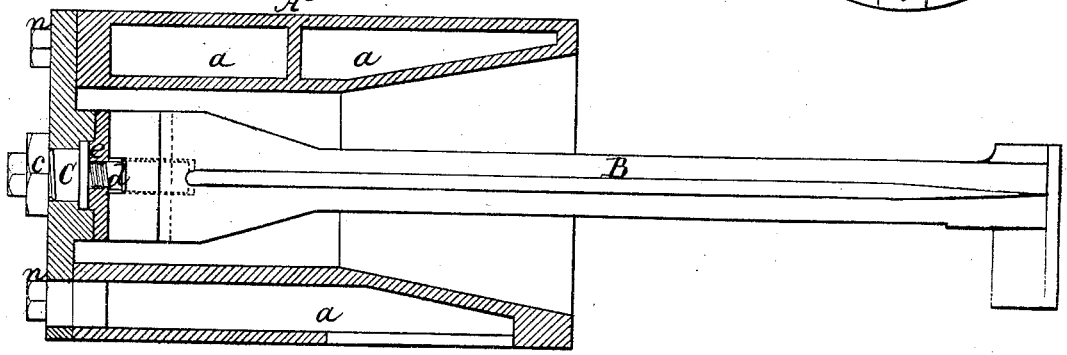
Witnesses:
John A. Bassett
J. L. Coombs
Inventor:
Justin Hinds
Giles Henry Lodge,
By J. L. Coombs,
Attorney

United States Patent Office.

JUSTIN HINDS, OF SALEM, AND GILES HENRY LODGE, OF SWAMPSCOTT, MASSACHUSETTS.

Letters Patent No. 76,448, dated April 7, 1868.

IMPROVEMENT IN STEAM-ENGINE PISTONS.

The Schedule referred to in these Letters Patent and making part of the same.

TO ALL WHOM IT MAY CONCERN:

Be it known that we, JUSTIN HINDS, of Salem, and GILES HENRY LODGE, of Swampscott, in the county of Essex, and State of Massachusetts, have invented a new and useful Improvement in Steam-Engines; and we do hereby declare that the following is a full, clear, and exact description thereof, reference being had to the accompanying drawings, and to the letters of reference marked thereon.

Our invention consists in a new method of attaching the connecting-rod to the piston in that class of pistons used in the Hicks steam-engine, and described in a patent issued to William Cleveland Hicks on the 21st day of February, 1865.

Previous to our invention, the connecting-rod in the Hicks engine, above referred to, was attached to a steel pin, passing through the centre of the piston, midway between the two ends, but several objections were developed to this mode of attachment by use, the principal one of which was that the passage of the steel pin through the cylindrical piston partially destroyed its elasticity, so that when it became necessary to expand the piston by means of the packing-wedge, only the upper half of the piston was expansible, or if the wedge were drawn tightly enough to expand the lower half of the piston, the pin became sprung, and thus cramped the free movement of the connecting-rod. This mode of attachment also involved the necessity of making the connecting-rod of such form that it lacked strength, and was not easily adjusted after it had worn loose. By means of our invention, these objections and defects are obviated. In the accompanying drawings—

Figure 1 is a vertical section through the longitudinal centre of a Hicks piston, with our improvement attached.

Figure 2 is a horizontal longitudinal section of the same.

Figure 3 is an end view of the piston.

A is the cylindrical piston, $a$ $a$, steam-passages between its external and internal surfaces, and B the connecting-rod. B' is the piston head, attached to the cylindrical portion of the piston by screw-bolts. C is a tubular nut, passing through a hole in the centre of the piston-head, and secured by a check-nut, $c$, screwed down upon the head, so as to prevent any escape of steam through the same. The nut C is closed at its outer end, to prevent the escape of any steam through it, and it serves the purpose of a bolt as well as a nut. $d$ is an eye-bolt, the front portion of which is screwed into the nut C, and the rear end pivoted to the connecting-rod by a pivot-bolt, $d'$. $e$ is a lining, fitting closely in a concave recess in the interior of the cast-iron piston-head, but removable therefrom when necessary. The eye-bolt $d$ passes through said lining before entering the nut C.

The end of the connecting-rod B is semicircular or convex, so as to fit into the concavity of the lining $e$, but has a recess, $f$, in the central portion of it, to receive the head of the eye-bolt $d$, and said recess is so formed as to allow the head of the eye-bolt to turn therein. When the joint becomes loose from wear, it may be easily tightened by turning the nut C.

To prevent the check-nut $c$ from being jarred out of place, a holding-plate, $g$, so made as to fit closely upon said nut, with an arm, $h$, extending to the circumference of the piston-head, is provided. Through the outer end of said arm is a hole, through which either of the three bolts $n$, which secure the piston-head to the cylindrical portion of the piston, may be passed, before being screwed home. The orifice in said holding-plate, which embraces the nut $c$, has twelve angles, $i$ $i$, all of which will fit the angles of said hexagonal nut $c$. Consequently, said holding-plate may always be so fitted on to the nut $c$ that its projecting arm $h'$ will come very near one of the bolts $n$, and so that a slight movement will bring it to coincide with such bolt, and permit the same to pass through it.

In the Hicks piston, to which our improvement is applicable, there is a packing-wedge, M, fig. 1, which, being drawn forward by turning the screw-bolt $m$, will expand the cylindrical portion of the piston, to compensate for wear. When the piston is thus to be expanded, the screw-bolts $n$ $n$ $n$ are loosened, and the bolt-holes in the piston-head being slightly elongated in the line of the expansion, allow the cylinder to expand without strain upon the bolts.

We are aware that it is not new to attach a connecting-rod to the inner side of the head of a hollow cylindrical piston, as this has been done in certain pumps and trunk-engines, but we are not aware that the connecting-rod has ever been so attached to an expansible cylindrical piston, or so attached to a hollow cylindrical piston as to allow the same to be expanded, without obstruction, by means of a packing-wedge, as herein described, or its equivalent. We do not, therefore, claim broadly attaching the connecting-rod directly to the piston-head; but What we do claim as our improvement, and desire to secure by Letters Patent, is—

1. In combination with an expansible cylindrical piston, as described, the detachable head B', with elongated bolt-holes, as described, or their equivalents, and connecting-rod jointed to said piston-head, substantially as set forth.

2. In combination with the piston-head and connecting-rod, we claim the tubular nut C, lining-plate e, and eye-bolt d, screwing into the nut C, and all arranged substantially as described.

JUSTIN HINDS,
G. H. LODGE.

Witnesses as to JUSTIN HINES:
 J. J. COOMBS,
 JOHN A. BASSETT.
Witnesses as to GILES HENRY LODGE:
 JACOB A. ALLEN,
 D. THAXTER.